US009638151B2

(12) United States Patent
Edwards et al.

(10) Patent No.: US 9,638,151 B2
(45) Date of Patent: May 2, 2017

(54) FLOW-THROUGH FITTING AND FILTER ASSEMBLY

(75) Inventors: Romaine Edwards, Greenwood, IN (US); Scott Salsburey, Ottawa, OH (US); Tamas Rauznitz, Columbus, IN (US); Mike Yost, Tiffin, OH (US)

(73) Assignee: Cummins Filtration, Inc., Nashville, TN (US)

( * ) Notice: Subject to any disclaimer, the term of this patent is extended or adjusted under 35 U.S.C. 154(b) by 1246 days.

(21) Appl. No.: 12/986,615

(22) Filed: Jan. 7, 2011

(65) Prior Publication Data
US 2012/0175291 A1   Jul. 12, 2012

(51) Int. Cl.
  *B01D 35/02*  (2006.01)
  *B01D 35/30*  (2006.01)
  *F02M 37/22*  (2006.01)
  *B01D 29/33*  (2006.01)

(52) U.S. Cl.
  CPC ............. *F02M 37/22* (2013.01); *B01D 29/33* (2013.01); *B01D 35/30* (2013.01); *B01D 35/02* (2013.01); *B01D 2201/306* (2013.01); *F02M 2200/27* (2013.01); *F02M 2200/8061* (2013.01)

(58) Field of Classification Search
  CPC ........ B01D 35/02; B01D 35/04; B01D 29/15; B01D 2201/306
  USPC ........ 210/232, 435, 447, 451, 452, 485, 454
  See application file for complete search history.

(56) References Cited

U.S. PATENT DOCUMENTS

| | | | |
|---|---|---|---|
| 2,057,779 A | * | 10/1936 | Jacobs ....................... 210/172.3 |
| 2,252,687 A | | 8/1941 | Bassett |
| 2,905,327 A | | 9/1959 | Phillips |
| 2,933,188 A | | 4/1960 | Jacula |
| 2,982,306 A | | 5/1961 | Fitzgibbon |
| 3,749,250 A | * | 7/1973 | Oldford ........................ 210/448 |
| 4,003,835 A | * | 1/1977 | Johnson ........................ 210/232 |
| 4,028,248 A | | 6/1977 | Murauskas et al. |
| 4,069,924 A | | 1/1978 | McCorkle |

(Continued)

FOREIGN PATENT DOCUMENTS

| | | | |
|---|---|---|---|
| CN | 101440763 | * | 5/2009 |
| DE | 10220632 A1 | * | 12/2002 |

(Continued)

OTHER PUBLICATIONS

The International Search Report and the Written Opinion of the International Searching Authority dated Apr. 30, 2012; International Application No. PCT/US11/66257.

*Primary Examiner* — Thomas M Lithgow
(74) *Attorney, Agent, or Firm* — Faegre Baker Daniels LLP

(57) ABSTRACT

A flow-through fitting and filter assembly is provided including a fitting body with a cavity, and a filter coupled to fitting body and positioned within the cavity. The filter includes a filter support and a filter element mounted on the filter support. A first end portion of the filter support is of a generally cylindrical cup shape including an outer annular wall in close sliding relationship the inner wall forming a fitting cavity to provide a guiding function while passages in the first end portion provide relief of fluid from the end of the cavity. A second end portion of the filter support includes an outer annular surface having an outer annular diameter greater than the inner annular diameter of the inner annular surface of the fitting body to create an interference fit and a fluid seal.

22 Claims, 3 Drawing Sheets

(56) References Cited

U.S. PATENT DOCUMENTS

| | | | |
|---|---|---|---|
| 4,111,370 A * | 9/1978 | Chelgren | 239/533.3 |
| 4,273,656 A * | 6/1981 | Arai | 210/448 |
| 4,853,123 A | 8/1989 | Hayes et al. | |
| 5,403,041 A | 4/1995 | Merkel et al. | |
| 5,548,893 A | 8/1996 | Koelfgen | |
| 5,992,515 A | 11/1999 | Spiegel | |
| 2001/0003312 A1 | 6/2001 | Spiegel | |
| 2001/0037971 A1 | 11/2001 | Bergeron | |
| 2004/0069704 A1* | 4/2004 | Yamaguchi et al. | 210/497.01 |
| 2004/0094953 A1 | 5/2004 | Luft et al. | |
| 2005/0000876 A1 | 1/2005 | Knight | |
| 2006/0260995 A1 | 11/2006 | McCormick et al. | |
| 2007/0068734 A1* | 3/2007 | Williams et al. | 184/1.5 |
| 2007/0193929 A1 | 8/2007 | Brown et al. | |
| 2008/0053884 A1 | 3/2008 | Marshall et al. | |
| 2011/0062061 A1 | 3/2011 | Chajec | |

FOREIGN PATENT DOCUMENTS

| | | | |
|---|---|---|---|
| FR | 2616851 A1 * | 12/1988 | |
| JP | 06-212989 A * | 8/1994 | |
| JP | 09-303124 A * | 11/1997 | |
| WO | WO 2006/049598 A1 * | 5/2006 | |

\* cited by examiner

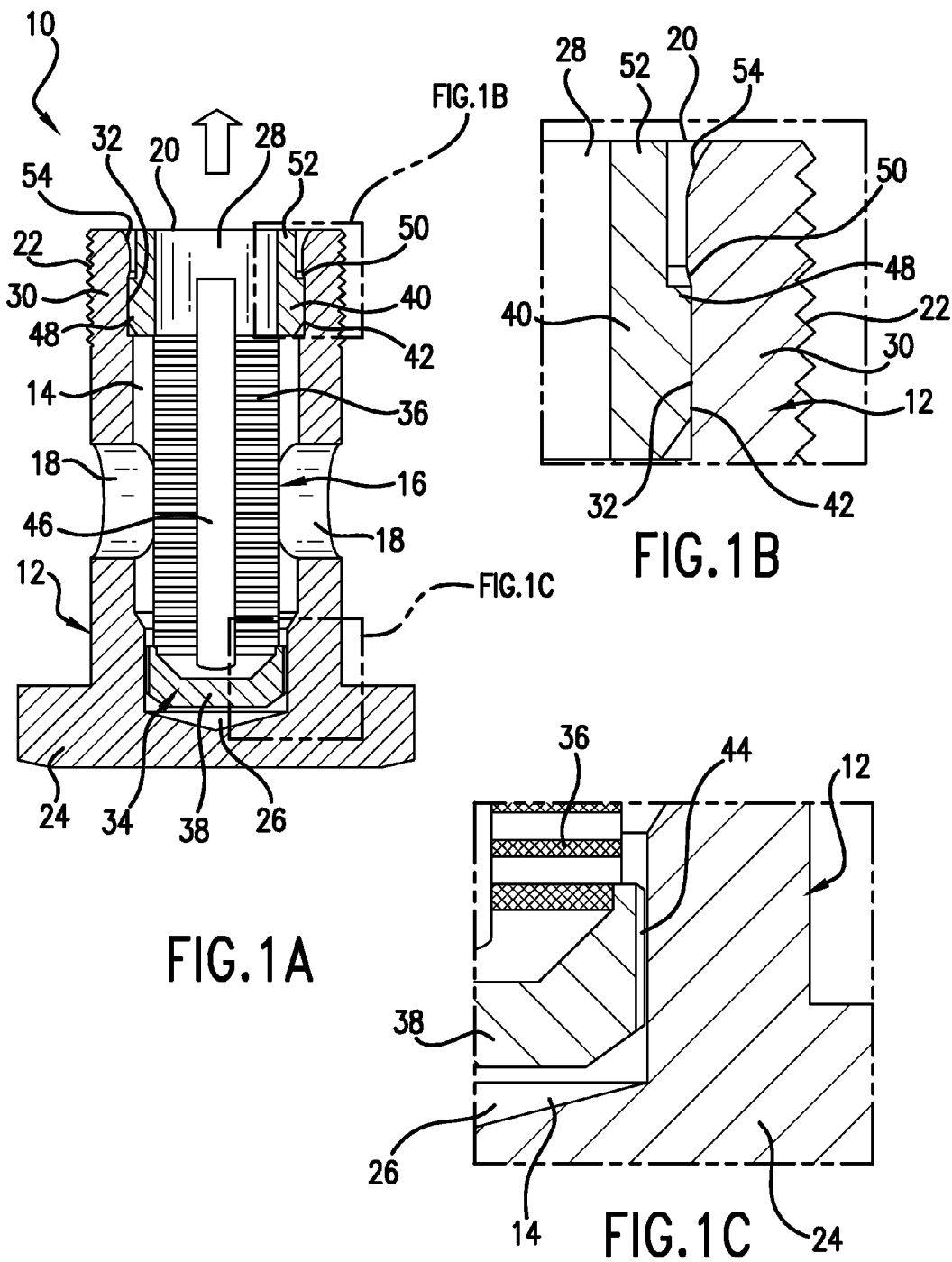

FLOW-THROUGH FITTING AND FILTER ASSEMBLY

TECHNICAL FIELD

This invention relates to flow-through fittings for fluid systems and more particularly relates to flow-through fittings containing fluid filters.

BACKGROUND

Fluid systems, especially in engine applications, are often highly susceptible to particle contamination. Particle contamination may clog or impede fluid flow within the system. In engine applications, particle contamination may negatively affect system performance, increase engine emissions, or even permanently damage engine components. Additionally, particle contamination may be difficult and expensive to repair. Often such repairs include flushing the fluid system, a complete replacement of the system fluid, or replacement of system components. These issues are especially problematic and expensive in fuel systems having high pressure fuel lines, fuel pumps, fuel injectors, and closer matched components.

Engine fuel systems often use banjo bolts or other flow-through fittings to connect fuel pressure lines to other components. These flow-through fittings typically include two or more openings and a channel that connects the openings and allows fluid to flow through the fitting.

SUMMARY OF THE INVENTION

The invention provides a flow-through fitting and filter assembly for connection to an engine, comprising a fitting body including a cavity, at least one first opening, a second opening in fluid communication with the at least one first opening, and a securing mechanism adapted to secure the fitting to the engine. The cavity includes an inner end and an outer end. The fitting body includes an outer end portion including an inner annular surface having an inner annular diameter. The assembly also includes a filter coupled to the fitting body and positioned within the cavity. The filter includes a filter support and a filter element mounted on, such as molded in/on, the filter support. The filter support includes a first end portion positioned adjacent the inner end and a second end portion positioned adjacent the outer end. The second end portion includes an outer annular surface having an outer annular diameter greater than the inner annular diameter to create an interference fit and a fluid seal between the outer annular surface and the inner annular surface.

The second end portion may also include an annular protrusion including the outer annular surface. The outer end portion of the fitting body may include an annular groove including the inner annular surface and sized to receive the annular protrusion. The filter support may be formed of a flexible material with sufficient resiliency to permit the outer end portion to flex radially inwardly upon insertion of the filter into the cavity and to flex radially outwardly to position the annular protrusion in the annular groove. The first end portion of the filter support may include a plurality of passages formed in an outer annular surface to permit fuel flow between the outer annular surface and the inner annular surface of the fitting body. The first end portion may be unconnected to the fitting body and the second end portion may be connected to the fitting body to secure the filter to the fitting body. The fitting may be positioned entirely within the cavity.

Advantages and features of the present invention will become more apparent from the following detailed description of the preferred embodiments of the present invention when viewed in conjunction with the accompanying drawings.

BRIEF DESCRIPTION OF THE DRAWINGS

FIG. 1A is a cross sectional view of an exemplary embodiment of the flow-through fitting and filter assembly consistent with the claimed invention;

FIG. 1B is an enlarged cross sectional view of the area 1B of FIG. 1A;

FIG. 1C is an enlarged cross sectional view of the area 1C of FIG. 1A;

DETAILED DESCRIPTION

Figure 3:
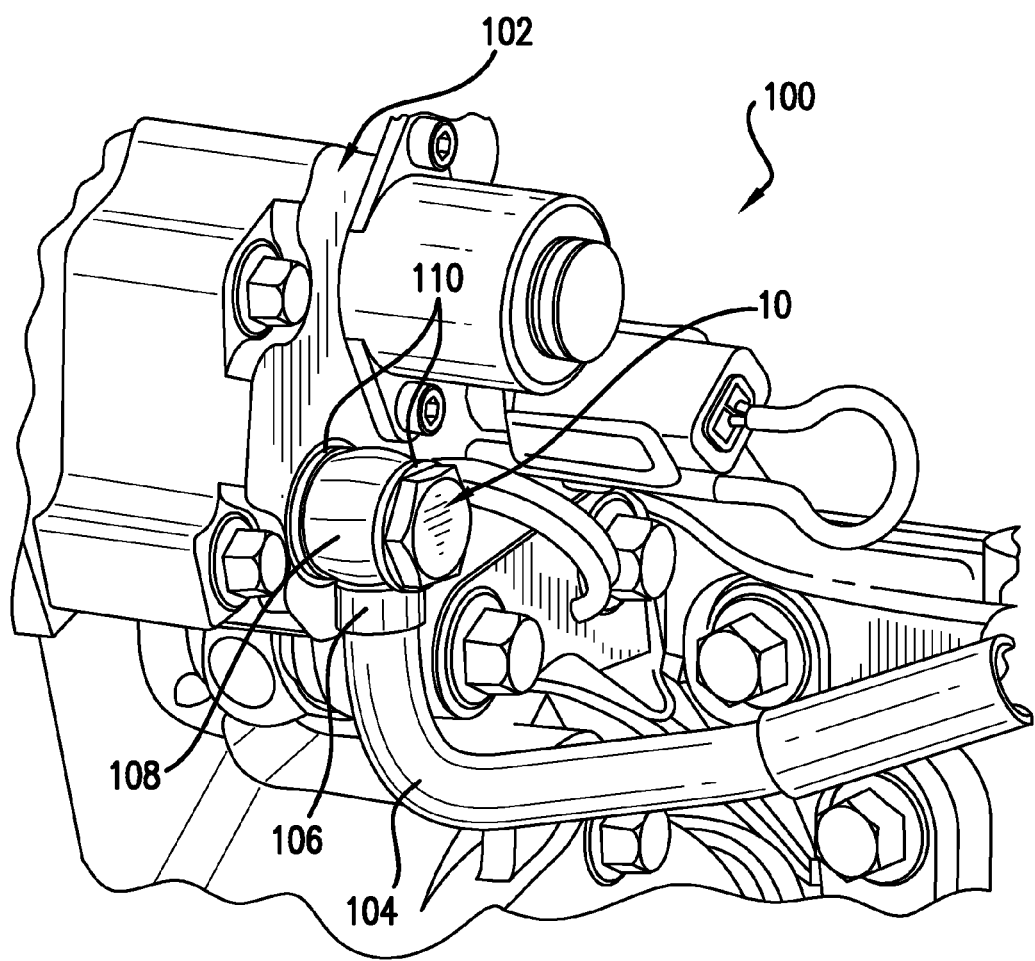
FIG. 3 is a perspective view of an engine fuel system with the fitting and filter assembly of FIG. 1A installed.

FIG. 1A depicts an exemplary embodiment of a flow-through fitting and filter assembly 10 consistent with the claimed invention. In the depicted embodiment, the flow-through fitting and filter assembly 10 includes a fitting body 12 including a cavity 14, and a filter 16 coupled to fitting body 12 and positioned within cavity 14. Fitting body 12 includes at least one first opening 18 and a second opening 20 connected in fluid communication by cavity 14. Additionally, flow-through fitting body 12 is shown as a fitting including a securing mechanism 22 for securing the assembly to an engine (FIG. 3).

As used herein, the term "fitting" includes a connecting, coupling, angled, or other like accessory used for fluid transfer, fluid routing, coupling, and the like. For example, the term fitting may be compatibly used in terms such as pipe fittings, conduit fittings, filter fittings, engine fittings, valve fittings, and the like. In the exemplary embodiment, the fitting and filter assembly 10 is used in a fuel system of an internal combustion engine.

In one exemplary embodiment, fitting body 12 is made of metal such as steel, copper, iron, aluminum, alloy, or the like. For example, fitting body 12 may be a stainless steel threaded bolt. Alternatively, fitting body 12 may be formed of plastic such as, for example, an injection molded plastic tubing connector. In either case, fitting body 12 is configured for the flow-through of fluid, i.e. fuel. One example of such a flow-through fitting body 12 is a banjo bolt used in a fuel system of an internal combustion engine. The securing mechanism 22 preferably includes threads formed on the outer surface of fitting body 12 to mate with complimentary threads formed in a receiving cavity and on an engine component, but other mechanisms for securing fitting body 12 to an engine component may be used.

Fitting body 12 may include a head 24 configured to facilitate securing the fitting and filter assembly 10 to an engine component, i.e. housing or pump head, using securing mechanism 22 by, for example, grasping head 24 with a tool and rotating fitting body 12 to cause complimentary threads to engage by relative rotation between the body 12 and the engine component. In the exemplary embodiment, at least one first opening 18 includes two pairs of opposed openings staggered a different axial distance along the longitudinal axis of fitting body 12. Second opening 20 is positioned at one end of fitting body 12 opposite head 24 while the pairs of first openings are positioned axially between second opening 20 and head 24 and extend transversely through fitting body 12 to fluidly connect with cavity 14. Cavity 14 includes an inner or blind end 26 positioned adjacent one end of fitting body 12 and an outer end 28 positioned adjacent an opposite end of body 12. As shown in FIG. 1B, fitting body 12 also includes an outer end portion 30 including an inner annular surface 32 having an inner annular diameter.

Figure 2A:
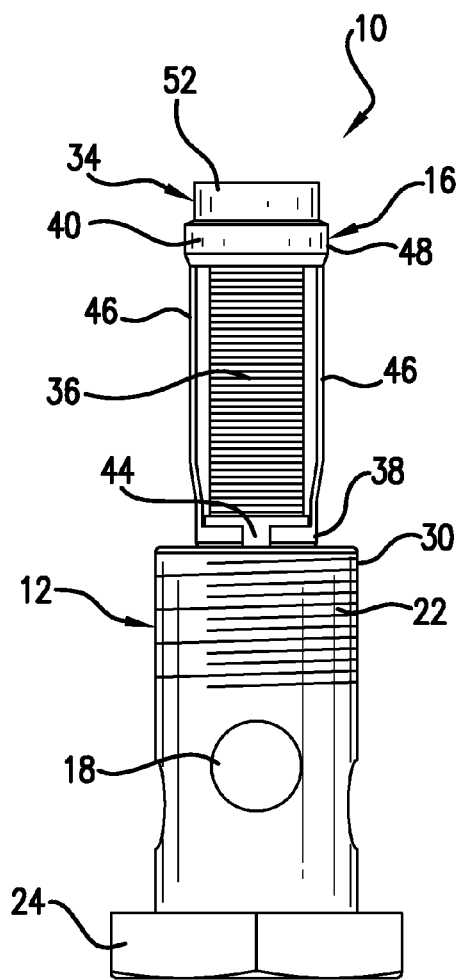
FIG. 2A is a side view of the fitting and filter assembly of FIG. 1A with the filter removed.
Figure 2B:
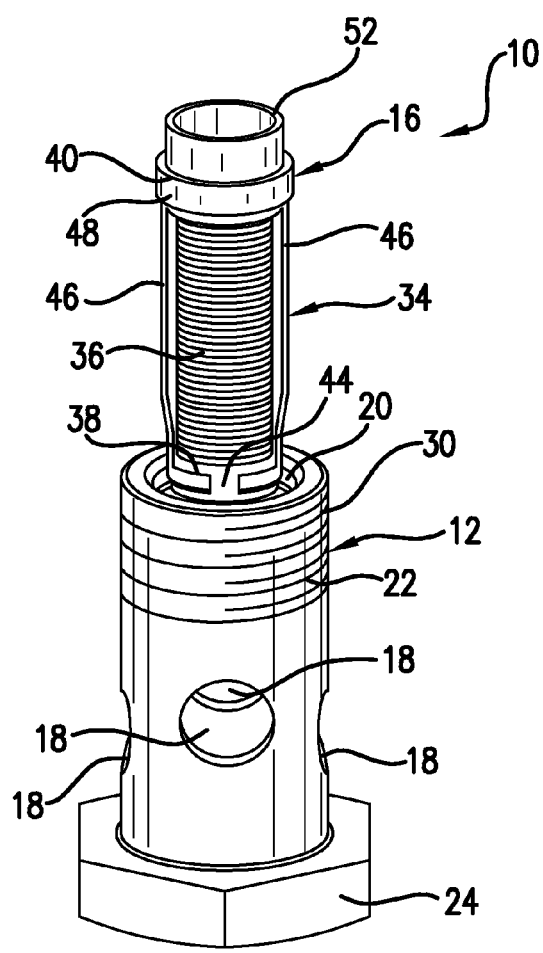
FIG. 2B is a perspective view of the fitting and filter assembly of FIG. 1A with the filter removed.

As shown in FIGS. 1A, 2A and 2B, filter 16 includes a filter support 34 and a filter element 36 mounted on filter support 34. Filter support 34 includes a first end portion 38 positioned adjacent inner end 26 and a second end portion 40 positioned adjacent outer end 28. Second end portion 40 includes an outer annular surface 42 having an outer annular diameter greater than the inner annular diameter of inner annular surface 32 of fitting body 12 to create an interference fit and a fluid seal between outer annular surface 42 and inner annular surface 32. First end portion 38 may have a generally cylindrical cup shape including an outer annular wall in close sliding relationship the inner wall forming cavity 14. The outer annular wall of portion 38 has an outer diameter only slightly less than the opposing inner annular wall of filter body 12 forming cavity 14 to permit first end portion 38 to be positioned within the inner end 26 of cavity 14 yet guided into position. Thus first end portion 38 functions as a guide member to guide filter 16 during installation and operation of filter 16 while permitting both axial movement of first end portion 38 relative to fitting body 12 due to, for example, thermal expansion of the components, and easy removal/replacement of filter 16. A plurality of passages 44 are formed in, and spaced around the circumference of, the outer annular wall of first end portion 38 to permit fuel passage from the inner end 26 of cavity 14 axially along fitting body 12 toward second end portion 40 thereby preventing fluid pressure build-up in inner end 26 of cavity 14. A plurality of support legs 46, i.e. two, extend axially to connect first end portion 38 and second end portion 40 of filter support 34.

Second end portion 40 of filter support 34 is generally cylindrically shaped and positioned in alignment with first end portion 38. As noted above, second end portion 40 includes an outer annular surface 42 having an outer annular diameter greater than the inner annular diameter of inner annular surface 32 of fitting body 12 to create an interference fit and a fluid seal between outer annular surface 42 and inner annular surface 32. As shown in FIG. 1B, outer annular surface 42 of second end portion 40 may be formed on an annular land or protrusion 48. Also, outer end portion 30 of fitting body 12 may include an inner annular recess 50 positioned opposite annular protrusion 48 to receive protrusion 48. Each end of protrusion 48 includes a lip to limit any inadvertent axial movement of filter support 34. However, the difference in diameters and thus the interference fit between outer annular surface 42 and inner annular surface 32 also resists axial movement while importantly creating a fluid seal to prevent fluid flow axially along cavity 14 between fitting body 12 and filter support 34. As a result, all the fuel flow entering openings 18 must flow transversely through filter element 36 into a central portion of element 36 within cavity 14 and then axially along the central portion and out of assembly 10 via second opening 20.

Second end portion 40 also includes an annular extension 52 extending toward second opening 20. Annular extension 52 includes an outer diameter less than the inner diameter of outer end portion 30 to create a gap for the insertion of a tool for installation or removal of filter 16. An annular beveled surface or chamfer 54 may be provided on the inner edge of outer end portion 30 to guide filter 16 into cavity 14 during assembly and to permit access by a removal tool during replacement of filter 16. Preferably filter support 34 is formed of a plastic material to permit both flexing of support 34 during insertion into fitting body 12 as the larger diameter outer annular surface 42 slides against the inner surface 32 and the creation of an substantial fluid seal between surfaces 42 and 32 when filter 16 is in a fully installed position as shown in FIG. 1A. However, filter support may be formed of any material, such as a polymer, capable of providing sufficient support to filter element 36 while creating a substantial fluid seal against fitting body 12 at outer end portion 30.

In the exemplary embodiment, filter 16 is positioned substantially entirely within cavity 14 so that substantially no portion of filter 16 extends out of cavity 14. Alternatively, a portion of filter 14 may extend outwardly from second opening 20. In one embodiment, filter element 36 may be a particle screen formed of wire mesh, synthetic mesh, natural fiber mesh, or corrugated fiber layers. For example, filter element 36 may include a cylindrical screen formed of metal wire mesh. Filter element 36 is fixedly attached to fitting body 12 by, for example, fusing adhesive, ultrasonic welding, or other suitable means. Filter element 36 may include a hollow or vacant core. Filter element 36 may be configured with a cylindrical cross-section, with a diameter less than or equal to the diameter of the fitting body of the banjo bolt, and to be elongated with respect to the filter diameter. In certain embodiments, some characteristics of filter element 36 may be optimized to increase fluid flow rates and reduce clogging. For example, the hole size of filter element 36 may be optimized to improve flow rate, the length of screen extending within the cavity may be increased to reduce clogging, the screen material and thicknesses may be optimized to reduce surface tension, and the like.

In certain embodiments, filter element 36 may include a woven wire mesh or an extruded synthetic mesh. Alternatively, filter element 36 may include an injection molded, cast, or otherwise manufactured mesh. The mesh may include holes of variable sizes, wherein the hole sizes are dependent on the particle size that is to be blocked. Additionally, the mesh may include various hole shapes depending on the weave, strand overlay, or extrusion method used in manufacturing. Indeed, it is not required that the mesh be woven. The mesh may include strands of polymer or wire that are overlain and fused.

FIG. 3 illustrates one embodiment of an engine system 100 including flow-through fitting and filter assembly 10. System 100 includes a high pressure fuel pump unit 102 mounted on an engine and a low pressure delivery line 104 delivering low pressure fuel to the high pressure pump for subsequent delivery to the engine's cylinder via a high pressure fuel delivery system including, for example, fuel injectors (not shown). Low pressure delivery line 104 is connected at one end to a low pressure supply system and at a downstream end 106 to flow-through fitting and filter assembly 10 via a collar 108. In the exemplary embodiment, collar 108 includes a central passage for permitting fitting body 12 to extend through collar 108 while collar 108 surrounds the cylindrical portion of assembly 10. A seal and/or washer 110 is positioned at each end of collar 108 for sealing abutment by head 24 and the engine pump unit housing. Fuel flows from low pressure delivery line 104 into the annular space between collar 108 and fitting body 12. Referring to FIG. 1A, fuel then flows through openings 18 and through filter element 36 and then axially toward and through second opening 20 and onward to the high pressure fuel system. Any fuel attempting to flow between fitting body 12 and filter element 36 axially toward outer end 28 will be blocked by annular protrusion 48 and prevented from bypassing filter element 34 by the substantial positive fluid seal between annular protrusion 48 and outer end portion 30 of fitting body 12. The fuel flow is thus directed radially inward through filter element 36.

Flow-through fitting and filter assembly 10 thus prevents debris from entering the downstream fluid system, i.e. high pressure fuel system, thereby preventing adverse effects such as excessive or undesirable fueling performance shifts or deviations associated with debris/particles clogging fuel injector sprays, and fatigue cracks due to dents caused by impinging debris. Flow-through fitting and filter assembly 10 is compact and permits easy, simple filter replacement while ensuring the filter is locked in place both axially and radially within the assembly.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A flow-through fitting and filter assembly for connection to an engine, comprising:
   a fitting body including a cavity, at least one first opening, a second opening in fluid communication with said at least one first opening, and a securing mechanism adapted to secure the fitting to the engine, said cavity including an inner end and an outer end, said fitting body including an outer end portion including an inner annular surface having an inner annular diameter, said second opening configured to permit flow out of said flow-through fitting and filter assembly; and
   a filter coupled to the fitting body and positioned within said cavity and extending across said at least one first opening, said filter including a filter support and a filter element mounted on said filter support, said filter support including a first end portion positioned adjacent said inner end and a second end portion positioned adjacent said outer end that extends toward said second opening, said second end portion including an outer annular surface that protrudes into said inner annular surface and configured to transversely slide against the inner annular surface, thereby having an outer annular diameter greater than said inner annular diameter to create an interference fit and a fluid seal between said outer annular surface and said inner annular surface.

2. The flow-through fitting and filter assembly of claim 1, wherein said second end portion includes an annular protrusion including said outer annular surface.

3. The flow-through fitting and filter assembly of claim 2, wherein said outer end portion of said fitting body includes an annular groove including said inner annular surface and sized to receive said annular protrusion.

4. The flow-through fitting and filter assembly of claim 3, wherein said filter support is formed of a flexible material with sufficient resiliency to permit said outer end portion to flex radially inwardly upon insertion of said filter into said cavity and to flex radially outwardly to position said annular protrusion in said annular groove.

5. The flow-through fitting and filter assembly of claim 1, wherein said first end portion of said filter support includes a plurality of passages formed in an outer annular surface to permit fuel flow between said outer annular surface and said inner annular surface of said fitting body.

6. The flow-through fitting and filter assembly of claim 1, wherein said first end portion is unconnected to said fitting body, said second end portion being connected to said fitting body to secure said filter to said fitting body.

7. The flow-through fitting and filter assembly of claim 1, wherein said filter is positioned entirely within said cavity.

8. The flow-through fitting and filter assembly of claim 1, wherein said at least one first opening comprises two pairs of opposed openings staggered a different axial distance along a longitudinal axis of said fitting body.

9. The flow-through fitting and filter assembly of claim 1, wherein said securing mechanism comprises threads formed on an outer surface of said fitting body to mate with complimentary threads formed in a receiving cavity and on an engine component.

10. The flow-through fitting and filter assembly of claim 9, wherein said fitting body comprises a head configured to facilitate securing said flow-through fitting and filter assembly to said engine component using said securing mechanism by grasping said head with a tool and rotating said fitting body to cause said complimentary threads to engage by relative rotation between said fitting body and said engine component.

11. The flow-through fitting and filter assembly of claim 10, wherein said second opening is positioned at one end of said fitting body opposite said head while said at least one first opening is positioned axially between said second opening and said head and extend transversely through said fitting body to fluidly connect with said cavity.

12. The flow-through fitting and filter assembly of claim 1, wherein an outer annular wall of said first end portion has an outer diameter that is less than a diameter of an inner annular wall of said filter body forming said cavity to permit said first end portion to be guided into position within said inner end of said cavity.

13. The flow-through fitting and filter assembly of claim 2, wherein said annular protrusion comprises a lip to limit axial movement of said filter support.

14. The flow-through fitting and filter assembly of claim 1, wherein said second end portion comprises an annular extension extending toward said second opening.

15. An assembly comprising:
   a fitting body including a cavity having an inner end and an outer end, at least one first opening, and an outer end portion including an inner annular surface having an inner annular diameter; and
   a filter coupled to the fitting body and positioned within said cavity and extending across said at least one first opening, said filter including a filter support having a first end portion positioned adjacent said inner end and a second end portion positioned adjacent said outer end, said second end portion including an outer annular surface that protrudes into said inner annular surface and configured to transversely slide against the inner annular surface, and has an outer annular diameter greater than said inner annular diameter to create an interference fit and a fluid seal between said outer annular surface and said inner annular surface, said outer end extending towards an opening configured to permit flow out of said assembly.

16. The assembly of claim 15, wherein said second end portion includes an annular protrusion including said outer annular surface.

17. The assembly of claim 16, wherein said outer end portion of said fitting body includes an annular groove including said inner annular surface and sized to receive said annular protrusion.

18. The assembly of claim 17, wherein said filter support is formed of a flexible material with sufficient resiliency to permit said outer end portion to flex radially inwardly upon insertion of said filter into said cavity and to flex radially outwardly to position said annular protrusion in said annular groove.

19. The assembly of claim 15, wherein said first end portion of said filter support includes a plurality of passages formed in said outer annular surface to permit fuel flow between said outer annular surface and said inner annular surface of said fitting body.

20. The assembly of claim 15, wherein said first end portion is unconnected to said fitting body, said second end portion being connected to said fitting body to secure said filter to said fitting body.

21. The flow-through fitting and filter assembly of claim 1, wherein said fitting body is a banjo bolt.

22. The assembly of claim 15, wherein said fitting body is a banjo bolt.

* * * * *